United States Patent [19]

Pagone et al.

[11] Patent Number: 5,135,245

[45] Date of Patent: Aug. 4, 1992

[54] RECYCLING CART AND CONTAINER SYSTEM

[75] Inventors: Vincent C. Pagone, Chicago; C. S. John Allegretti, Oak Park; Joshua B. Lesnick, Chicago, all of Ill.

[73] Assignee: Hyatt Corporation, Chicago, Ill.

[21] Appl. No.: 647,436

[22] Filed: Jan. 29, 1991

[51] Int. Cl.$^5$ .................. B62B 5/00; B65D 25/22
[52] U.S. Cl. ..................... 280/79.2; 220/23.4; 248/907; 280/79.5; 280/79.7
[58] Field of Search ............... 280/47.26, 47.19, 47.35, 280/79.11, 79.2, 79.5, 79.7, 79.6; 248/129, 98, 907; 220/23.4

[56] References Cited

U.S. PATENT DOCUMENTS

| | | | |
|---|---|---|---|
| 2,802,673 | 8/1957 | Hazlett | 248/129 |
| 3,232,441 | 2/1966 | Mitscherling | 248/907 |
| 3,276,600 | 10/1966 | Black et al. | 248/129 |
| 3,876,223 | 4/1975 | O'Reilly et al. | 280/47.19 |
| 3,904,218 | 9/1975 | Kostic | 280/79.2 |
| 4,357,029 | 11/1982 | Marini et al. | 280/47.19 |
| 4,821,903 | 4/1982 | Hayes | 280/47.26 |
| 4,984,704 | 1/1991 | O'Malley | 280/47.19 |

FOREIGN PATENT DOCUMENTS 2720694 11/1978 Fed. Rep. of Germany ... 280/79.11

Primary Examiner—Andres Kashnikow
Assistant Examiner—Eric Culbreth
Attorney, Agent, or Firm—Wallenstein, Wagner & Hattis, Ltd.

[57] ABSTRACT

A cart and container assembly for collecting recyclable waste, and the like, is disclosed. The cart and container assembly comprises a plurality of containers. Each of the containers is substantially rectangular in horizontal cross section and has a front wall, a rear wall, a pair of opposing side walls. The containers have an elongated, arcuate bottom. The cart and container assembly further includes a cart having a base and a superstructure. The base includes a pair of parallel support rods defining a groove for receiving the arcuate bottoms of the carts. The superstructure further defines a plurality of container receiving sections. The rear wall of each of the containers includes a bar and each of the containers includes a plurality of hooks. Each of the hooks is aligned with a respective one of the container bars when the respective one of the containers is disposed within a respective one of the container receiving sections. The hooks and their respective bars cooperate to maintain the containers in an upright position in the cart.

9 Claims, 3 Drawing Sheets

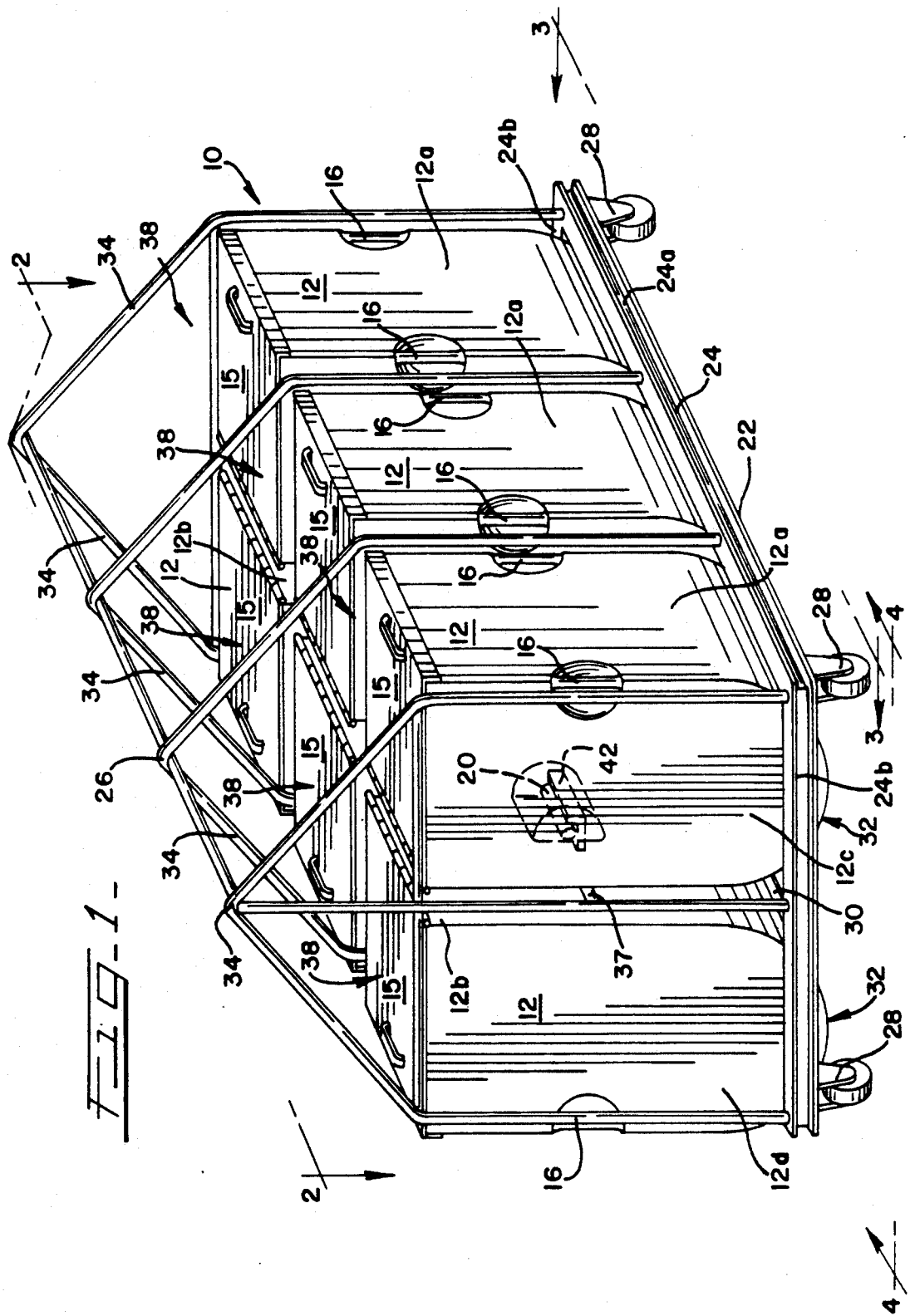

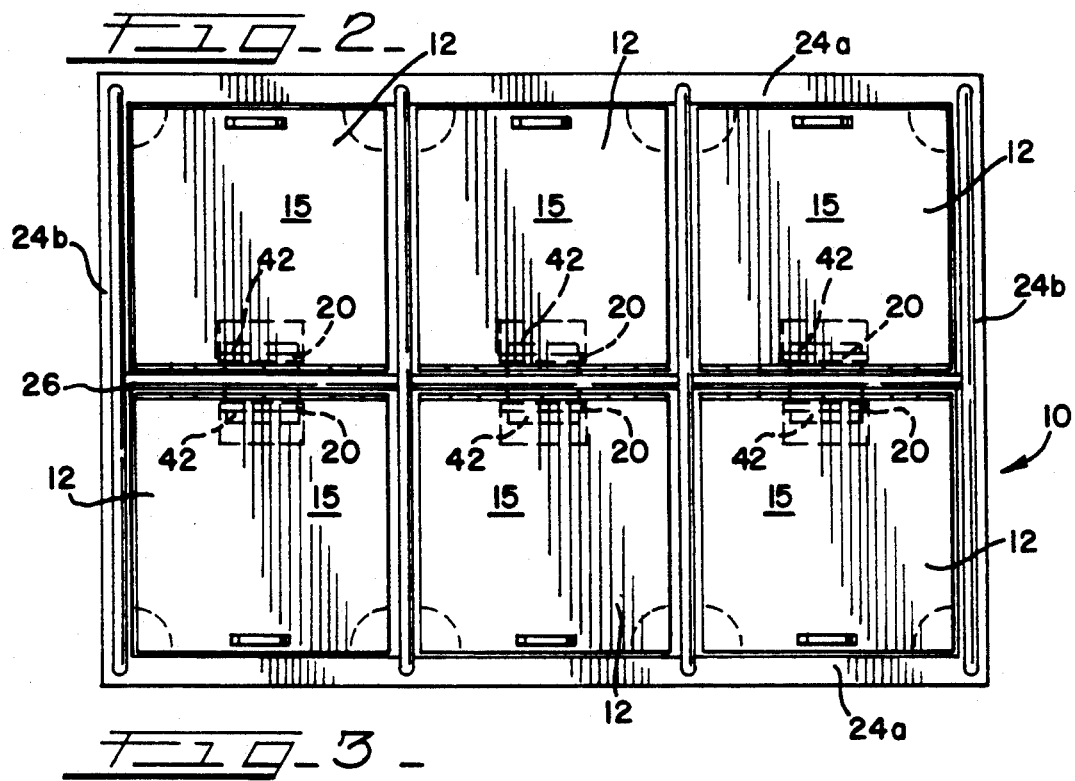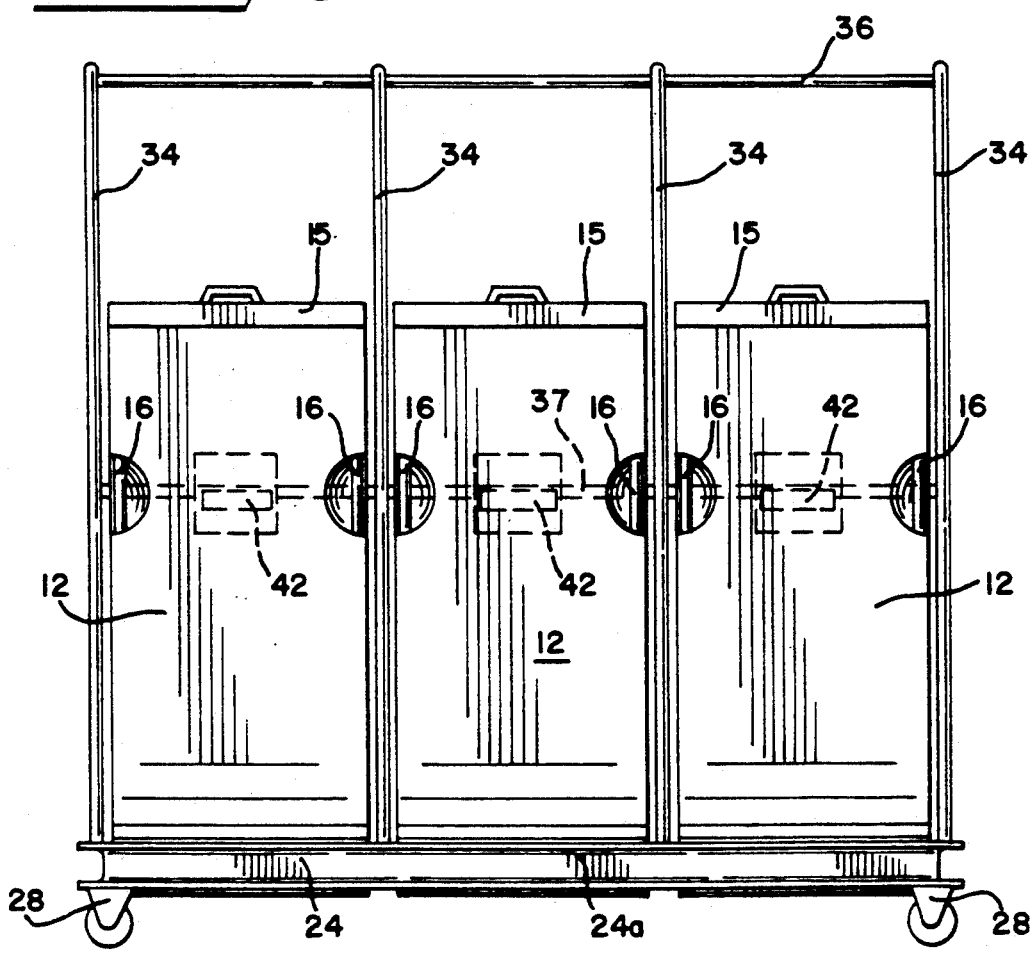

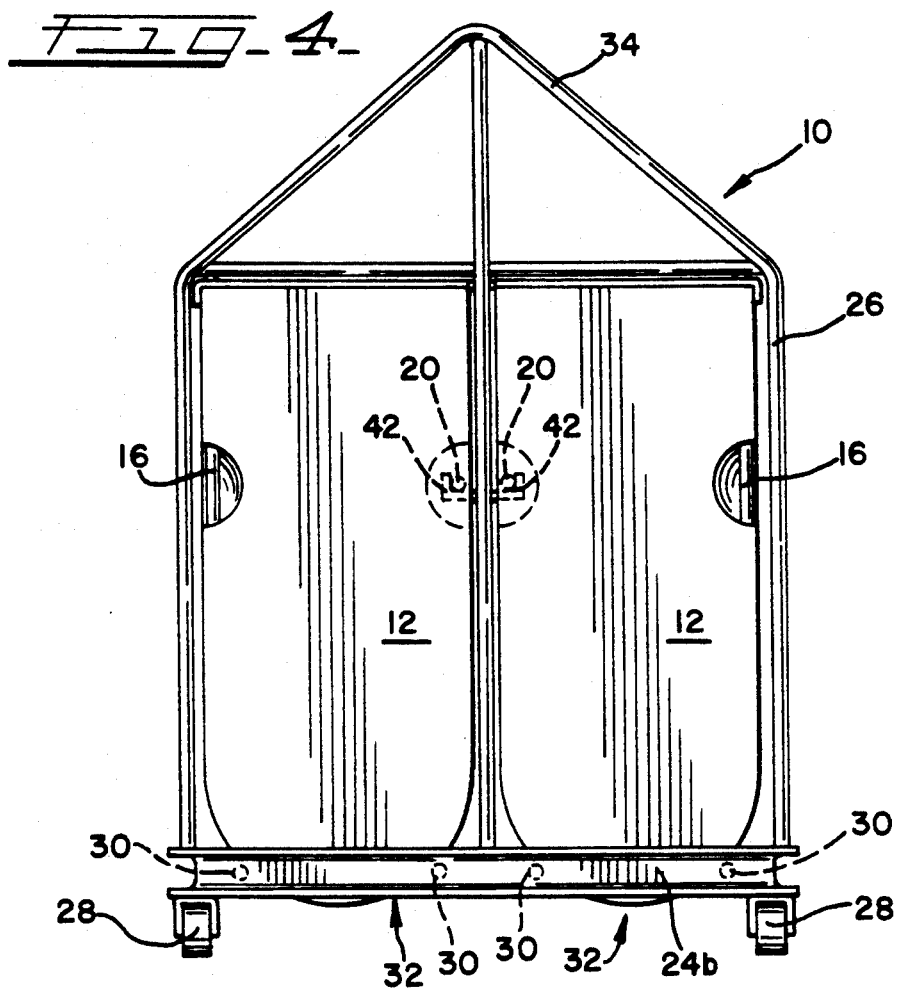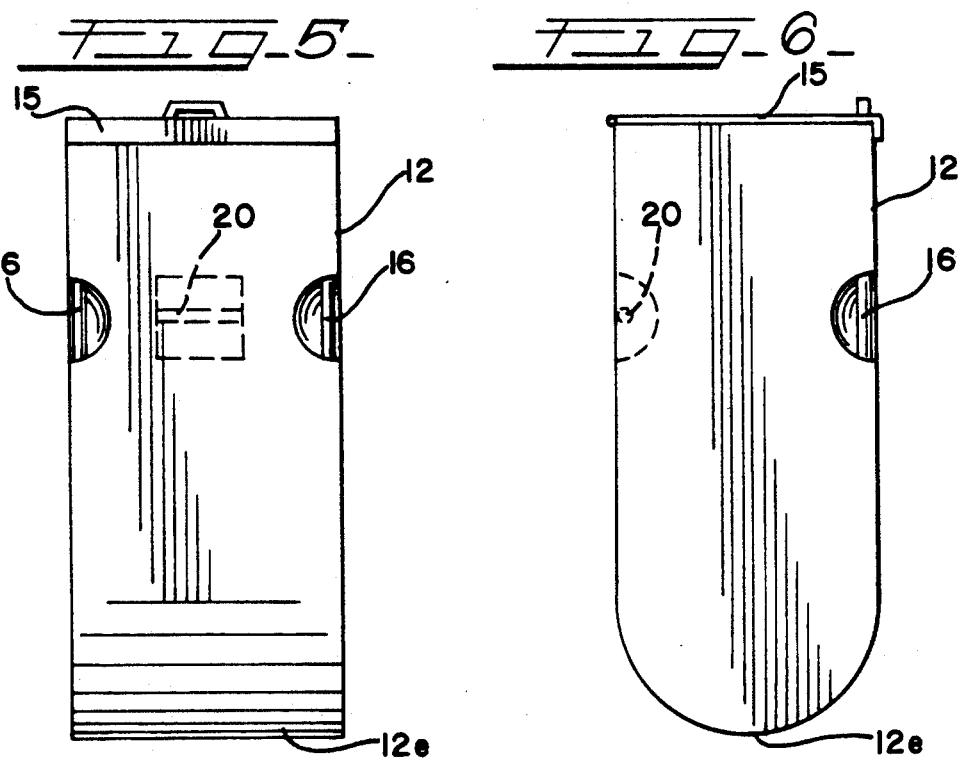

RECYCLING CART AND CONTAINER SYSTEM

DESCRIPTION

1. Technical Field

Applicant's invention relates to a system for facilitating recycling and, more particularly, to a recycling cart and containers therefor.

2. Background of the Invention

Operations such as hotels or other such facilities typically generate a large quantity of recyclable waste. This recyclable waste often must be manually collected and sorted. In order to efficiently manually collect, sort, and thereby recycle, this recyclable waste, some sort of containers must be provided Hayes, U.S. Pat. No. 4,821,903 discloses a trash bin cart and bin assembly having a metal cart accommodating four individual trash bins Kostic, U.S. Pat. No. 3,904,218 discloses a complementary trash can unit having a movable, circular base member supporting four trash cans. While the trash bins disclosed in Hayes and Kostic can function to receive recyclable waste, the trash bins have flat bottoms, and thus are self-supporting. Self-supporting trash bins can pose a problem because they can be used independent of their associated carts and therefore, are more subjected to theft.

Applicant's invention is provided to solve this and other problems.

SUMMARY OF THE INVENTION

It is an object of the invention to provide a cart and container assembly.

In accordance with the invention, the cart and container assembly comprises a plurality of containers. Each of the containers is substantially rectangular in horizontal cross section and has a front wall, a rear wall and a pair of opposing side walls. The containers have an elongated, arcuate bottom.

The cart and container assembly further includes a cart having a base and a superstructure. The base includes a pair of parallel support rods defining a groove for receiving the arcuate bottoms of the carts. The superstructure further defines a plurality of container receiving sections.

It is contemplated that the rear wall of each of the containers includes a bar and that each of the containers includes a plurality of hooks. Each of the hooks is aligned with a respective one of the container bars when the respective one of the containers is received in the groove. The hooks and their respective container bars cooperate to maintain the containers in an upright position in the cart.

Other features and advantages of the invention will be apparent from the following specification taken in conjunction with the following drawings.

BRIEF DESCRIPTION OF DRAWINGS

FIG. 1 is a perspective view of the cart and container assembly according to the invention;

FIG. 2 is a plan view of the cart and container system taken along line 2—2 of FIG. 1;

FIG. 3 is a side view of the cart and container system taken along line 3—3 of FIG. 1;

FIG. 4 is an end view of the cart and container system taken along line 4—4 of FIG. 1;

FIG. 5 is a front view of one container of the cart and container system; and

FIG. 6 is a side view of the container of FIG 5.

DESCRIPTION OF THE PREFERRED EMBODIMENT

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the particular embodiment illustrated.

A cart and container assembly, generally designated 10, is illustrated in FIG. 1.

In the preferred embodiment, the cart and container assembly 10 includes six containers 12. Each of the particular containers 12 typically is formed of a molded plastic and is designated to receive a particular waste, such as glass, paper, metal, and the like. Depending on the waste to be collected, any number of the containers 12 could be utilized without departing from the spirit and scope of the invention.

Each of the containers 12 is substantially rectangular in horizontal cross section and has a front wall 12a, a rear wall 12b, a pair of opposing side walls 12c, 12d, respectively, and an elongated, arcuate bottom 12e. It should be noted that the containers 12 could have other cross-sectional configurations, such as circular, without departing from the spirit and scope of the invention. As discussed in greater detail below, the arcuate bottom 12e precludes the container 12 from being self-supporting. Each of the containers 12 further includes a pivotable lid 15 and, additionally, a pair of molded handles 16 disposed at the junction of the front wall 12a with the side walls 12c and 12d, respectively. Additionally, each of the containers 12 includes a molded container bar 20 substantially flush with the rear wall 12b.

The cart and container assembly 10 further includes a cart 22 formed of a material such as aluminum or stainless steel. The cart 22 has a base 24 and a superstructure 26. The base 24 is formed of a rectangular aluminum frame having a pair of spaced longitudinal frame members 24a and spaced transverse frame members 24b. Mobility is provided by four wheel assemblies 28. The wheel assemblies 28 could be standard casters (not shown) to facilitate turning the cart 22 around tight corners. As discussed in greater detail below, the base includes two pairs of spaced parallel support rods 30, which extend longitudinally between the transverse frame members 24b. Each pair of the parallel support rods 30 defines a groove 32 for receiving the arcuate bottoms 12e of the carts 12.

The superstructure 26 is formed of four generally A-frame members 34 joined by an upper longitudinal support 36 and a lower longitudinal support 37. The four A-frame members 34 and the upper and lower longitudinal supports 36,37 are formed of aluminum tubing.

The base 24 and the superstructure 26 cooperate to form six container receiving sections 38, each for receiving one of the six containers 12.

As discussed above, the rear wall of each of the containers includes a container bar 20. The cart 24 includes six generally hook-like members 42 secured to the lower longitudinal support 37 and aligned with a respective one of the container bars 20 when the respective one of the containers 12 is positioned in a respective one of the container receiving sections 38. Because the containers 12 have rounded bottoms, they have a tendency to tip over if simply placed the groove 32 of the base 24. Thus the hooks 42 and the respective container bars 20 are provided to cooperatively maintain the containers 12 securely in an upright position in the cart 22. When removed from the cart 22, the containers 12 must be leaned against a surface, such as a wall, not shown, in order to prevent the container 12 from tipping over. This requirement that the containers 12 must be leaned against a surface when removed from the cart 24 greatly limits the desirability of stealing the containers 12.

The cart and container assembly 10 is illustrated in alternate views in FIG. 2 and FIG. 3.

An end view of the cart and container assembly 10 is illustrated in FIG. 4, wherein the two pairs of spaced parallel support rods 30 (in phantom) which define the respective pair of the grooves 32 for receiving the arcuate bottoms of the carts 12 are shown in greater detail. Additionally, the hooks 42 and respective container bars 20 are illustrated cooperatively maintaining the containers 12 securely in an upright position in the cart 22.

FIG. 5 and FIG. 6 illustrate the molded handles 16 disposed at the junction of the front wall 12a with the side walls 12c and 12d, respectively. Additionally, the molded container bar 20 substantially flush with the rear wall 12b is also illustrated.

While only a single cart 22 has been particularly illustrated, it is comprehended that a plurality of carts 22 could be coupled together.

It will be understood that the invention may be embodied in other specific forms without departing from the spirit or central characteristics thereof. The present embodiment, therefore, is to be considered in all respects as illustrative and not restrictive, and the invention is not to be limited to the details given herein.

We claim:

1. A cart and container assembly comprising:
    a plurality of containers, each of said containers having a front wall, a rear wall and an elongated, arcuate bottom;
    a cart having a base, said base including an outer frame and a groove, said groove for receiving said arcuate bottoms of said carts; and
    hook-and-bar stabilizer means for stabilizing each of said containers in an upright position in said cart, said stabilizer means including one of a bar and a hook mounted to said rear wall of each of said containers and the other of said bar and said hook mounted to said cart, each of said hooks aligned with a respective one of said bars when said respective one of said containers is received in said groove, said hooks and respective bars cooperating to maintain said containers in an upright position in said cart.

2. The assembly of claim 1 wherein each of said containers includes a pair of handles disposed substantially on said front wall.

3. The assembly of claim 1 wherein each of said containers includes a pivotable lid.

4. The assembly of claim 1 wherein each of said containers is formed of molded plastic.

5. The assembly of claim 1 wherein said cart is formed of aluminum.

6. The assembly of claim 1 wherein each of said containers includes one of said bar and said cart includes said hooks.

7. A cart and container assembly comprising:
    a plurality of containers, each of said containers having a front wall, a rear wall, a pair of opposing side walls and an elongated, arcuate bottom;
    a cart having a base and a superstructure, said base including a pair of opposing side walls and an elongated, arcuate bottom;
    a cart having a base and a superstructure, said base including a pair of parallel support rods defining a groove for receiving said arcuate bottoms of said carts, and said superstructure defining a plurality of container receiving sections; and
    hook-and-bar stabilizer means for stabilizing each of said containers in an upright position in said cart, said stabilizer means including one of a bar and a hook mounted to said rear wall of each of said containers and the other of said bar and said hook mounted to said cart, each of said hooks aligned with a respective one of said bars when said respective one of said containers is received in said groove, said hooks and respective bars cooperating to maintain said containers in an upright position in said cart.

8. The cart and container assembly of claim 7 wherein each of said containers is substantially rectangular in horizontal cross-section.

9. The assembly of claim 7 wherein each of said containers includes one of said bar and said cart includes said hooks.

* * * * *

UNITED STATES PATENT AND TRADEMARK OFFICE
CERTIFICATE OF CORRECTION

PATENT NO.   : 5,135,245

DATED        : August 4, 1992

INVENTOR(S)  : Vincent C. Pagone, C.S. John Allegretti, and Joshua Ben Lesnick

It is certified that error appears in the above-identified patent and that said Letters Patent is hereby corrected as shown below:

In column 3, line 2, please add --in-- between "placed" and "the."

In column 4, please delete lines 24 to 26.

Signed and Sealed this

Sixteenth Day of November, 1993

BRUCE LEHMAN

*Attest:*

*Attesting Officer*  *Commissioner of Patents and Trademarks*